Figure 1:
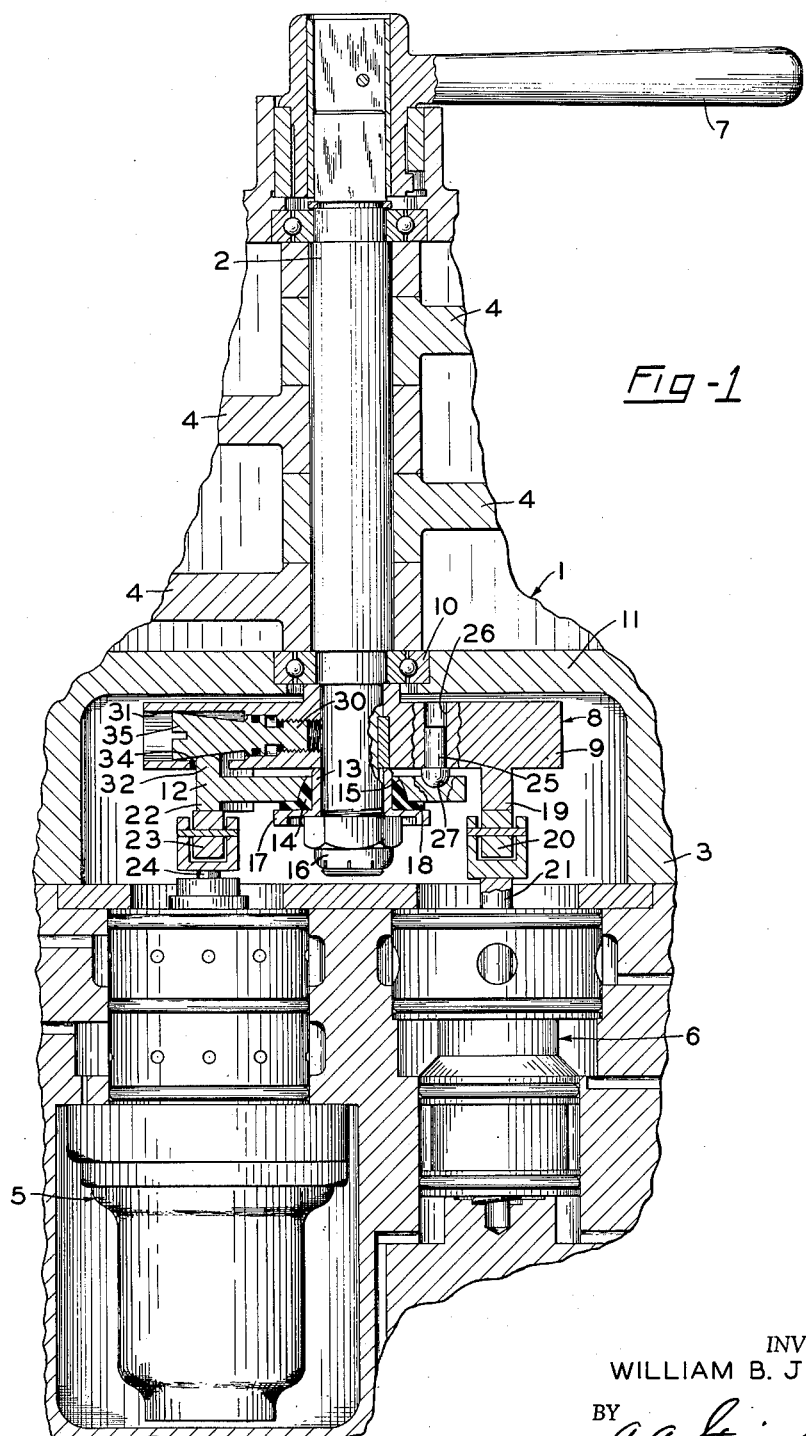

INVENTOR.
WILLIAM B. JEFFREY
BY
*A. G. Steinmiller*
ATTORNEY

Nov. 13, 1962    W. B. JEFFREY    3,063,306
ADJUSTABLE CAM DEVICE
Filed March 16, 1960    2 Sheets-Sheet 2
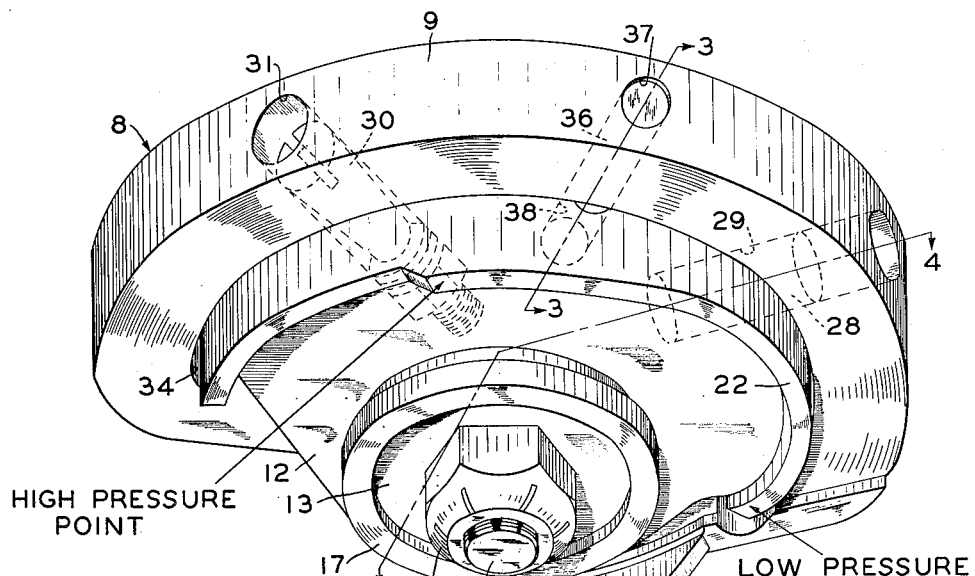
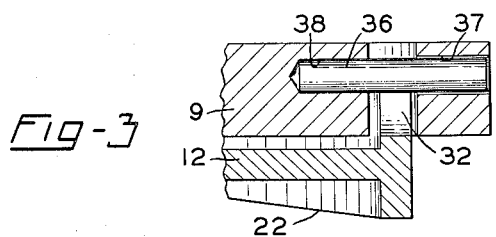
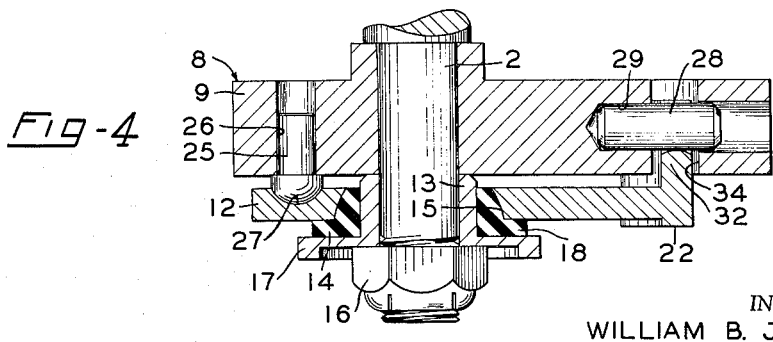
INVENTOR.
WILLIAM B. JEFFREY
BY
ATTORNEY

United States Patent Office 3,063,306
Patented Nov. 13, 1962

3,063,306
ADJUSTABLE CAM DEVICE
William B. Jeffrey, Irwin, Pa., assignor to Westinghouse Air Brake Company, Wilmerding, Pa., a corporation of Pennsylvania
Filed Mar. 16, 1960, Ser. No. 15,288
7 Claims. (Cl. 74—568)

This invention relates to adjustable cam arrangements and, more particularly, to a cylindrical or plate type cam carried on and operable by a concentric camshaft and having novel means for adjusting the plane of operation of the cam relative to the axis of the shaft, whereby the amount of movement imparted to the cam follower by the cam may be varied or adjusted.

The novel adjustable cam arrangement constituting the present invention imparts a greater versatility of use to the cylindrical type cam, as will be presently considered. Shaft-operated cams are use, for example, in certain types of engineers' brake control valve devices for railway vehicles and trains, in which type of device the cam shaft may have several axially spaced-apart radial cams arranged thereon (similarly to the camshaft of an automobile), whereby, upon rotation of the camshaft about its axis, each cam operates a respective valve disposed in the brake control device at a right-angle relationship to the camshaft. An example of the type of control valve device above mentioned is an operator's brake valve device commonly known as the Westinghouse ME-42 brake valve. A detailed description of the ME-42 brake valve device is not deemed essential to an understanding of this invention and reference hereinafter to the ME-42 brake valve device, therefore, will be of a general nature.

Component of the ME-42 brake valve device is a self-lapping valve device operated by one of the cams on the camshaft, the camshaft in turn being rotatably operable about its axis, in well-known manner, by an operator's control handle fixed to one end thereof exteriorly of the casing. The function of the self-lapping valve device is to control the supply of fluid under pressure to the straight air pipe of the brake system in a manner that the pressure of said fluid supplied to the straight air pipe is proportional to the amount of movement of the operator's control handle through a service zone, that is, the operating range of the control handle between the running position and the full service position, or between a certain low pressure (usually atmospheric) at which the brakes are released and a certain high pressure at which maximum braking is effected, the degree of braking between said low and high pressure being proportionate to the amount of movement of the control handle. Since requirements for braking pressures may vary among various braking systems, the self-lapping valve device is usually arranged on the brake valve device in such manner that the low and high operating pressures, and therefore the operating range of the service zone may be adjusted to the particular requirements of the remainder of the braking equipment with which the brake valve device is employed. The self-lapping valve device, as customarily arranged on the ME-42 brake valve device, is disposed at a right-angle relationship to the axis of the brake valve device and the camshaft and projects beyond the general radial contour of the brake valve device. Accessibility to the self-lapping device is provided to permit adjustment of the fluid pressure operating range, if necessary. It is desirable, however, to rearrange the position of the self-lapping valve device on the brake valve device in order to streamline the overall contour of the brake valve device, whereby less installation space would be required in the engineer's cab, and yet maintain accessibility to the means of adjustment of the self-lapping valve device.

It is the object of the invention, therefore, to provide a novel adjustable cam arrangement on a camshaft having means for adjusting the relative position of the cam surface to the camshaft, whereby the magnitude of motion imparted by the cam to a cam follower may be adjusted to the particular requirement of the device to be operated by the cam such as the example cited above, that is, the self-lapping valve device of an operator's brake control valve device. By using applicant's invention it is possible, as will be hereinafter explained, to rearrange the position of the self-lapping valve device in the control valve device to provide a more compact device having a contour requiring less installation space.

Essentially, the invention comprises a cylindrical type cam formed on a primary cam plate carried concentrically on a camshaft with a resilient bushing, of suitable material such as rubber, between the camshaft and said cam plate to provide a certain amount of flexibility between the cam plate and the camshaft for adjustment purposes. The primary cam plate is in contact, adjacent its periphery and at three angularly spaced bearing points, with an auxiliary cam plate coaxially and rigidly keyed to the camshaft and axially spaced apart from said primary cam plate, which is coupled to said auxiliary cam plate for rotation therewith. The respective axial distances between the primary and auxiliary cam plates at two of said bearing points remain fixed while that at the third bearing point is adjustable. An adjusting screw, axially disposed on a preselected radius of the auxiliary cam plate passing through the adjustable bearing point, has a tapered portion in peripheral contact with the preselected peripheral point on the primary cam plate, whereby, by screwing the adjusting screw into or out of the auxiliary cam plate, the primary cam plate is caused to be pivoted about an axis passing through the two fixed bearing points to increase or decrease, respectively, the distance between the two plates at said preselected peripheral point, the resilient bushing between the primary cam plate and the camshaft acting as a spring which yields to allow the adjustment. The resilient bushing is arranged between the primary cam plate and the camshaft in such a manner as to axially bias said primary cam plate toward the auxiliary cam plate to the bearing contact therebetween. Moreover, the resilient bushing is of sufficient rigidity to support the primary cam plate on the cam shaft without wobble. By adjusting the primary cam plate as above described, the plane of rotation thereof relative to the axis of the camshaft is accordingly adjusted to provide the desired path of movement of the cam surface.

In the accompanying drawings, FIG. 1 represents an elevational, cross-sectional view of a portion of an operator's brake control valve device with the invention applied thereto; FIG. 2 is a perspective view, on a larger scale, of a cam assemblage applied in the device shown in FIG. 1 and embodying the invention; FIG. 3 is a cross-sectional fragmental view of the cam assemblage shown in FIG. 2 taken along line 3—3 as viewed in the direction indicated by the arrows; and FIG. 4 is a cross-sectional view taken along line 4—4 of FIG. 2 as viewed in the direction indicated by the arrows.

DESCRIPTION AND OPERATION

For purposes of illustrating a practical application of the invention, a cut-away portion of the ME-42 brake control valve device, briefly described above, is shown in FIG. 1 and designated by the reference numeral 1. A camshaft 2 extends coaxially into a casing 3 of the brake control valve device 1, said camshaft having fixed thereon a plurality of axially spaced radial cams 4 (partially shown) for operating respective valve devices (not shown) comprising components of said brake control valve device. The lower portion of the casing 3, as viewed in the drawing, serves to house a self-lapping valve device 5 and an emergency valve device 6, both of which are generally shown in outline, it not being deemed essential to show said valve devices in detail to understand the invention. The valve devices 5 and 6 are each disposed axially parallel to the axis of the camshaft 2 and at equal radial distances at opposite ends of a diameter passing through the axis of said camshaft.

An operator's control handle 7 is removably carried at the exterior end of the camshaft 2 for operating said camshaft rotatably about its axis, whereby the radial cams 4 operate the several valve devices (not shown) as intended and in accordance with the angular position occupied by said control handle. The control handle 7, in well-known manner, is operable from a release position at one extremity of a service zone, in which release position the brakes on the vehicle are released, through said service zone to a full service position at the other extremity thereof, in which full service position a maximum brake application is effected, the degree of brake application for any position of said handle between the release and full service positions being proportional to the amount of movement of said handle through said service zone. Beyond the full service position of the control handle 7, said handle is operable to an emergency position, in which maximum application of the brakes on the vehicle is effected in the shortest time capable by the brake equipment, and thence to a handle-off position in which the brakes remain applied and the handle may be removed.

A cam assemblage 8 is carried on the camshaft 2 at the interior end thereof opposite the end at which the handle 7 is carried and interiorly of the casing 3 so as to be in position for operating the valve devices 5 and 6.

According to the invention, the cam assemblage 8 comprises an auxiliary cam plate 9 coaxially keyed to the camshaft 2 for rotation therewith and abutting against the inner race of a ball-type bearing 10 mounted in an internal separating wall 11 in casing 3 for rotatably supporting the ends of said camshaft adjacent said cam assemblage. A primary cam plate 12 is provided with a concentric spacer bushing 13 and a rubber bushing 14 interposed between the external surface of said spacer bushing and a coaxial bore 15 formed in said primary cam plate, said rubber bushing providing a swivel joint for a purpose to be hereinafter described. The primary cam plate 12 is removably mounted on the camshaft 2 at a substantially right-angle relationship thereto by the spacer bushing 13, which serves to axially space said primary cam plate from the auxiliary cam plate 9 at their hubs, and by a nut 16 screwed on the end of said camshaft. The spacer bushing 13 has a flange 17 formed thereon against which the nut 16 abuts, said flange providing a backing support for a flange portion 18 formed on the rubber bushing 14, which flanged portion 18 is compressed between the primary cam plate 12 and said spacer bushing and, thereby, acts to axially bias said primary cam plate toward the auxiliary cam plate 9 when the nut 16 is drawn up. That portion of the external surface of the rubber bushing 14 in contact with the surface of bore 15 in the primary cam plate 12, and said surface of said bore, as shown in the drawings, are spheroidal in character with the largest circumference adjacent the flange portion 18. Though the particular shape of the rubber bushing 14 and the bore 15, as shown, allow swivel action of the primary cam plate 12 relative to the cam shaft 2, as will hereinafter be explained, it should be understood that it is not intended to limit the shape of said bushing and said bore to that described, but that any shape such as a conical one, for example, is suitable as long as it provides the desired results.

The auxiliary cam plate 9 is provided with a cylindrical cam portion 19 (see FIG. 2) so radially spaced from the axis of said cam plate as to operably engage a follower 20 at the end of a valve stem 21 of the emergency valve device 6. The primary cam plate 12 is also provided with a cylindrical cam portion 22 (see FIG. 2) so radially spaced from the axis of said cam plate as to operably engage a follower 23 at the end of a valve stem 24 of the self-lapping valve device 5. The primary cam plate 12 is in contact, adjacent its periphery, with the auxiliary cam plate 9 at three approximately equi-angularly spaced bearing points which bear the combined axial forces imposed on said primary cam plate by the compressed rubber bushing 14 and biasing springs (not shown) in the valve devices 5 and 6 acting on valve stems 21 and 24 for biasing the followers 20 and 23 against the cams 19 and 22, respectively.

One of the above-mentioned bearing points is provided by a round-headed pin 25 disposed in a bore 26 in the auxilary camp late 9 radially spaced from the axis of said cam plate and in parallel relation to said axis, said pin and bore being so located at a preselected angular position on the auxiliary cam plate as to have the rounded head of said pin engaged in a conformingly-shaped depression 27 formed at a preselected angular location on the primary cam plate 12 adjacent its periphery. In order to illustrate the structure of pin 25 and its disposition in the cam assemblage 8 in FIG. 1, both cam plates 9 and 12 are shown cut away and the position of said pin has been angularly rotated in the drawing about the axis of cam plate 9 sufficiently to make it appear in the plane of the drawing. Another of the above-mentioned points of bearing is provided by a pin 28 (see FIG. 4) pressed into a radially disposed bore 29 in the auxiliary cam plate 9 adjacent the periphery thereof. The third of the above-mentioned points of bearing is provided by an adjusting screw 30 which may be screwed into or out of a threaded portion of a bore 31 radially disposed in the auxiliary cam plate 9 in an angular position approximately midway between pins 25 and 28. The primary cam plate 12 has formed thereon a substantially semi-circular lip 32 running approximately half-way around the outer periphery of said primary cam plate so that when the cam plates 9 and 12 are in assembled position said lip extends axially into a semi-circular slot 34 running approximately 180° around the auxiliary cam plate 9 on a radius corresponding to that of said lip on said primary cam plate and cutting through both bores 29 and 31, said lip making contact adjacent one end thereof with the pin 28 and adjacent the other end with a tapered portion 35 of adjusting screw 30. A screw driver may be inserted in bore 31 for adjusting the screw 30.

A pin 36 (see FIG. 3) conveniently angularly located (in this case between pin 28 and screw 30) is pressed into a radially disposed bore 37 in the auxiliary cam plate 9 cutting across slot 34. The lip 32 of primary cam plate 12 adjacent pin 36 is recessed to permit operative engagement of said pin with said primary cam plate, whereby the two cam plates are coupled to each other for rotatable movement as a unit. The recess in lip 32, however, is of sufficient depth to prevent contact at any time of said pin with the bottom of said recess, as shown in FIG. 3, since said pin has no function in the adjustment of the primary cam plate 12 to be presently described.

From the above description it should be apparent that movement of the control handle 7 to any of its above enumerated positions causes corresponding rotative movement of the camshaft 2 and, therefore, of the radial cams 4 and the cam assemblage 8. Since it is not considered essential to an understanding of the invention, it suffices to merely note at this point that the character of the contours, lengths and other salient features of the radial cams 4 and the cam 19 of the cam assemblage 8 are designed to produce the desired operative effects on the respective devices controlled thereby.

As was above noted, however, it may be necessary to vary the fluid pressure operating range of the self-lapping valve device 5 to adjust it to the particular requirements of the brake equipment on the vehicle. The low pressure adjustment may be made by adjusting the compression of a spring (not shown) acting on a weighing piston (not shown) in the self-lapping valve device 5, which piston determines the low or minimum operating pressure desired in the straight air pipe. The position of cam 22 relative to the follower 23 of the self-lapping valve device 5 and corresponding to the low pressure position is indicated by the term "Low Pressure Point" on the cam 22 in FIG. 2 of the drawings, said position being the low point of the cam contour or surface, at which point the follower 23 is at its suppermost position, as viewed in FIG. 1, and the control handle 7 is in its release position. Since the axial depth of cam 22 gradually increases from a minimum at the low pressure point to a maximum depth at a high pressure point, as the cam assemblage 8 and, therefore, cam 22 is rotated clockwise, as viewed in FIG. 2, by moving the control handle 7 through the service zone, the cam surface of said cam moves over the follower 23 until the high point of the cam surface, indicated by the term "High Pressure Point" in FIG. 2 of the drawing, is in position over said follower, such movement of said cam thereby causing downward axial movement of valve stem 24 and therefore supply of fluid to the straight air pipe at a pressure directly proportional to the amount of movement of said control handle, said "High Pressure Point" corresponding to the full service position of the control handle and therefore maximum brake application.

According to the invention and as viewed in FIG. 2, it will be noted that the angular location of the "High Pressure Point" of cam 22 relative to the cam assemblage 8 substantially coincides with the angular location of the adjusting screw 31. This arrangement permits adjustment of the high pressure point of the cam surface and, therefore, adjustment of the amount of resultant axial movement of the valve stem 24. If, for example, screw 30 is screwed inwardly into bore 31, the point of contact of said screw with lip 32 on the primary cam plate 12 changes to a point on the tapered portion of the screw located on a larger circumference thereof; thus, the screw acts as a wedge driven between the two cam plates 9 and 12. Because of the flexible support provided by the rubber bushing 14 of the primary cam plate 12, said bushing yields, upon adjustment of screw 30, to permit said cam plate to pivot about a fulcrum comprising an imaginary axis passing through the two bearing points at pins 25 and 28 thus producing an adjustment of axial distance between the planes of rotation of the primary cam plate 12 and the auxliary cam plate 9, the maximum effect of said adjustment insofar as the cam 22 is affected, occurring at the peripheries of said cam plates adjacent the high pressure point of said cam and gradually diminishing over the entire length of the cam to a minimum effect at the low pressure point where the effect is so negligible as to be considered nil. Correspondingly, the amount of axial movement of the valve stem 24 is also affected to produce a corresponding effect on the pressure of fluid supplied to the straight air pipe, the maximum effect occurring in the full service position of the control handle 7. Thus, an inward adjustment of the adjusting screw 30 causes adjustment of the high pressure point on the primary cam plate 12 away from the auxiliary cam plate 9 and, therefore, a correspondingly greater amount of movement of valve stem 24 and a corresponding increase in pressure of fluid supplied to the straight air pipe.

Since, as above noted, the rubber bushing 14 axially biases the primary cam plate 12 toward the auxiliary cam plate 9, it should be apparent that any adjustment of screw 30 by screwing said screw outwardly from bore 31 produces an opposite effect to that above described regarding the adjustment of the high pressure point on cam 22, that is, the axial distance between the two cam plates at said high pressure point is reduced and the amount of axial movement of valve stem 24 and, therefore, the pressure of fluid supplied to the straight air pipe is reduced accordingly.

Although the utility of the invention described herein has been illustrated by employing the invention to operate a self-lapping valve device of an ME–42 brake control valve device, it should be understood that the use of the invention is not intended to be limited to the illustration herein. The novel adjustable cam arrangement described herein may be employed with any device operable by a cylindrical type cam with means for adjusting the operative results of the device.

Having now described the invention, what I claim as new and desire to secure by Letters Patent, is:

1. An adjustable cam arrangement comprising, in combination, a rotatable shaft, a primary cam plate, resilient means mounting said primary cam plate on said shaft in predetermined position substantially at right angles thereto and yieldably permitting limited angular movement relative to the axis of said shaft out of said predetermined position and exerting biasing force for restoring it thereto upon removal of the displacing force, an auxiliary cam plate fixed on said shaft in axially spaced relation to the said primary cam plate, means coupling said primary cam plate and auxiliary cam plate for rotation together, said primary cam plate having thereon a circular cam surface providing axial cam action parallel to the axis of said shaft, a plurality of cooperating bearing means on said primary cam plate and said auxiliary cam plate providing three substantially equi-angularly spaced bearing points, one of said bearing means comprising a member movably carried by said auxiliary cam plate in interposed relation between said auxiliary cam plate and said primary cam plate, said bearing member being of varying diameter and effective upon radial movement thereof toward and away from the axis of said shaft to vary the axial spacing between said primary cam plate and said auxiliary cam plate at the corresponding bearing point for effecting angular movement of the primary cam plate about an axis passing through the other two bearing points, thereby to vary the axial cam action of the cam surface.

2. An adjustable cam arrangement as claimed in claim 1 and further characterized in that said resilient means also functions to provide a biasing effect for axially biasing said primary cam plate toward said auxiliary cam plate for maintaining contact between the two cam plates at said bearing points.

3. An adjustable cam arrangement comprising, in combination, a rotatable camshaft, an auxiliary cam plate coaxially secured to said camshaft for rotation therewith, a primary cam plate, mounted on said camshaft at substantially right angles thereto and adapted for limited angular movement relative to the axis of said camshaft, said primary cam plate being axially spaced apart from said auxiliary cam plate, at the hubs thereof, being coupled thereto for rotation therewith and having formed thereon a cam for engagement with a cam follower of a device to be controlled by said cam, yieldable means for mounting said primary cam plate on said camshaft in a manner to permit said limited angular movement, resilient means encircling said camshaft and reacting thereon for biasing said primary cam plate toward said auxiliary cam plate, said primary cam plate making contact with said auxiliary cam plate at three substantially equiangularly located bearing points, the axial distance between said cam plates being fixed at two of said bearing points, and an adjusting screw interposed between said cam plates at the third bearing point which screw may be screwed into or out of a radially disposed bore in said auxiliary cam plate adjacent said third bearing point, said adjusting screw having formed thereon a tapered portion extending radially with respect to the axis of said camshaft for making said contact with said primary cam plate at said third bearing point, whereby, upon screwing of said adjusting screw into or out of said radially disposed bore said angular movement of said primary cam plate about an axis passing through said two bearing points is effected and the axial distance between the cam plates at said third bearing point is lengthened or shortened, respectively, to provide the desired action of said cam.

4. An adjustable cam arrangement as defined in claim 3, wherein said yieldable means comprises a rubber bushing interposed between said primary cam plate and said camshaft in a coaxial bore in said primary cam plate to permit said angular movement of said primary cam plate relative to the axis of said camshaft.

5. An adjustable cam arrangement as defined in claim 3, wherein said yieldable means comprises a rubber bushing and a spacer bushing concentrically disposed in a coaxial bore in the primary cam plate with the rubber bushing interposed between said spacer bushing and said bore, said primary cam plate being supported on said camshaft and axially spaced apart from said auxiliary cam plate by said spacer bushing, and said resilient means comprising a flanged portion of said rubber bushing compressed against the hub of said primary cam plate by an adjacent flanged portion formed on said spacer bushing.

6. An adjustable cam arrangement as defined in claim 5, further characterized in that the surface of said coaxial bore formed in said primary cam plate is spheroidal in shape to conform to the shape of the portion of said rubber bushing interposed between said primary cam plate and said spacer bushing in said coaxial bore, the largest diametral dimension of said spheroidal surface and rubber portion being adjacent the flanged portion of said rubber bushing.

7. An adjustable cam arrangement comprising, in combination, a rotatable camshaft, an auxiliary cam plate coaxially secured to said camshaft for rotation therewith and having formed therein a substantially semi-circular slot extending approximately 180° around said auxiliary cam plate adjacent its periphery, a primary cam plate mounted on said camshaft at substantially right angles thereto being adapted for limited angular movement relative to the axis of said camshaft and being axially spaced apart from said auxiliary cam plate at the hubs thereof, said primary cam plate having formed on one face thereof a semi-circular lip running approximately halfway around its periphery and extending axially into said slot in said auxiliary cam plate and having formed on the opposite face a cylindrical cam for engagement with a cam follower of a device to be controlled by said cam, a spacer bushing for supporting said primary cam plate on said cam shaft and having one end thereof in abutment with the adjacent hub of said auxiliary cam plate for spacing said primary cam plate apart therefrom, said spacer bushing having integrally formed at its other end a flanged portion against which a nut is screwed on one end of said camshaft for maintaining the cam arrangement assembled on the camshaft, a rubber bushing partly interposed between said spacer bushing and said primary cam plate in a coaxial bore formed in said primary cam plate to permit said angular movement of said primary cam plate, said coaxial bore in said primary cam plate being spheroidal in shape to conform to the shape of the portion of the rubber bushing disposed therein, the largest diametral dimensions of said spheroidal bore and said portion of the rubber bushing disposed therein being adjacent a flanged portion formed integrally on said rubber bushing and compressed between said flanged portion of said spacer bushing and the adjacent side of the hub of said primary cam plate to bias said primary cam plate toward said auxiliary cam plate, said primary cam plate making peripheral contact with said auxiliary cam plate at three substantially equiangularly spaced bearing points, the axial distance between said cam plates being fixed at two of said bearing points and that at the third bearing point adjacent one end of said lip and said slot being adjustable, a first pin fixedly pressed into a radially disposed bore cutting across said slot in said auxiliary cam plate and angularly spaced at substantially 120° from said one end of said slot, said lip making contact with said first pin to provide one of said two bearing points and to fix the axial distance between said plates thereat, a second pin axially disposed in said auxiliary cam plate to make peripheral contact with said primary cam plate at the other of said two bearing points, angularly located substantially midway between said one end of said slot and said first pin, for fixing the axial distance between said cam plates thereat, and an adjusting screw which may be screwed into or out of a radially disposed bore in said auxiliary cam plate adjacent said third bearing point at said one end of said slot and said lip, said adjusting screw having formed thereon a tapered portion with which said one end of said lip makes contact and by which, upon screwing of said adjusting screw into or out of said radially disposed bore, said angular movement of said primary cam plate, about an axis passing through said two bearing points, may be effected to respectively lengthen or shorten the axial distance between said cam plates at said third bearing point.

References Cited in the file of this patent

UNITED STATES PATENTS

| | | |
|---|---|---|
| 1,306,419 | Evensen | June 10, 1919 |
| 1,331,746 | Evensen | Feb. 24, 1920 |
| 2,143,937 | Chandler | Jan. 19, 1939 |
| 2,428,195 | Breeding | Sept. 30, 1947 |
| 2,924,120 | Johnson | Feb. 9, 1960 |